(12) United States Patent
Benabid (10) Patent No.: US 8,079,763 B2
(45) Date of Patent: Dec. 20, 2011

(54) OPTICAL ASSEMBLY OF A HOLLOW CORE FIBRE GAS CELL SPLICED TO FIBRE ENDS AND METHODS OF ITS PRODUCTION

(75) Inventor: Abdel Fetah Benabid, Bath (GB)

(73) Assignee: University of Bath, Bath (GB)

( * ) Notice: Subject to any disclaimer, the term of this patent is extended or adjusted under 35 U.S.C. 154(b) by 857 days.

(21) Appl. No.: 11/814,645

(22) PCT Filed: Jan. 24, 2006

(86) PCT No.: PCT/GB2006/000229
§ 371 (c)(1),
(2), (4) Date: Apr. 15, 2008

(87) PCT Pub. No.: WO2006/077437
PCT Pub. Date: Jul. 27, 2006

(65) Prior Publication Data
US 2011/0097045 A1    Apr. 28, 2011

(30) Foreign Application Priority Data
Jan. 24, 2005    (GB) .................................. 0501493.1

(51) Int. Cl.
*G02B 6/032*    (2006.01)
*G02B 6/255*    (2006.01)

(52) U.S. Cl. ............ 385/95; 385/12; 385/125; 385/122; 385/86; 65/393

(58) Field of Classification Search .................. 385/123, 385/125, 126, 147, 122, 12, 95, 96, 97, 98, 385/99; 65/393
See application file for complete search history.

(56) References Cited

U.S. PATENT DOCUMENTS

| 4,892,383 | A | * | 1/1990 | Klainer et al. .................. 385/12 |
| 5,116,759 | A | * | 5/1992 | Klainer et al. ............. 435/287.2 |
| 7,149,396 | B2 | * | 12/2006 | Schmidt et al. ............... 385/131 |
| 2004/0075886 | A1 | | 4/2004 | Brasseur et al. |
| 2004/0252957 | A1 | * | 12/2004 | Schmidt et al. ............... 385/131 |
| 2009/0323732 | A1 | * | 12/2009 | Benabid ........................... 372/3 |
| 2011/0097045 | A1 | * | 4/2011 | Benabid ........................ 385/95 |

FOREIGN PATENT DOCUMENTS

| EP | 0 374 677 B1 | 6/1990 |
| GB | 975539 A | 11/1964 |
| JP | 54098068 A | 8/1979 |

OTHER PUBLICATIONS

The ISR.
The Written Opin.
Koch et al., "Vertically Grating-Coupled Arrow Structures for III-V Integrated Optics," IEEE Journal of Quantum Electronics, QE-23(6):889-897, (1987).
Marcuse, "Directional Couplers Made of Nonidentical Asymmetric Slabs. Part I: Synchronous Couplers," Journal of Lightwave Technology, LT-5(1):113-118 (1987).
Marcuse, "Fiber-Coupled Short Fabry-Perot Resonators," Journal of Lightwave Technology, 7(5):869-876, (1989).

* cited by examiner

*Primary Examiner* — Brian Healy
(74) *Attorney, Agent, or Firm* — Rissman Hendricks & Oliverio, LLP (57) ABSTRACT

An optical assembly includes a gas cell and an optical fiber portion in which the gas cell is contiguously attached to the optical fiber portion. The gas cell can be made, for example from hollow-core photonic crystal fiber (HC-PCF).

14 Claims, 8 Drawing Sheets

FIG. 14

OPTICAL ASSEMBLY OF A HOLLOW CORE FIBRE GAS CELL SPLICED TO FIBRE ENDS AND METHODS OF ITS PRODUCTION

CROSS-REFERENCE TO RELATED APPLICATIONS

This application is filed under 35 U.S.C. 371 as a US national phase application of PCT/GB2006/000229, having an international filing date of Jan. 24, 2006, which claims the benefit of GB 0501493.1 having a filing date of Jan. 24, 2005, the entire contents of which are incorporated herein by reference in their entirety.

FIELD OF THE INVENTION

Background Section

Gas-phase materials such as gases and atomic vapours have many compelling laser-related applications, for example in high precision frequency measurement, quantum optics and non-linear optics. Up until now the lack of a suitable technology for creating gas cells in a single transverse mode over long interaction lengths (10s of meters) whilst offering a high level of integration in a practical and compact set-up has meant that the potential of gas-phase materials has gone largely unrealised.

One possible solution to this problem is described in "Compact atomic vapour cells fabricated by laser-induced heating of hollow-core glass fibres" by S. Knappe, V. Velichansky, H. G. Robinson and L. Holberg, in Review of Scientific Instruments, volume 76, number 6, June 2003. The authors describe a method for fabricating atomic vapour cells for application in highly miniaturised atomic clocks and magnetometers. These vapour cells demonstrated a relatively high signal-to-noise ratio, and can be used in applications such as frequency modulation. However the internal diameter of these cells is relatively large (1 mm) and only very short lengths (5 cm) have been demonstrated. The light power loss per unit length from these atomic vapour cells is also much too high for them to be used as effective optical waveguides.

"Stimulated Raman Scattering in Hydrogen-Filled Hollow-Core Photonic Crystal Fibre" by F. Benabid, J. C. Knight, G. Antonopoulos and P. St. J. Russell ("Benabid et al"), Science, volume 298, 11 Oct. 2002, demonstrates that a fibre with internal diameter of 15 µm or less could be filled with Hydrogen. The fibres used here are approximately 1 metre long, and demonstrate very low light power loss per unit length; however the experiment makes use of cumbersome gas-delivery chambers at the ends of each fibre.

STATEMENT OF INVENTION

The invention is set out in the claims. Contiguous attachment of the gas cell to the optical fibre portions ensures that the cell is well sealed and removes the need to maintain the cumbersome gas-delivery chambers at either end of the cell once it has been filled. Integration within an optical fibre makes the gas cell compact and portable. The invention also allows the gas cell to be easily integrated within devices such as lasers, phase modulators, power attenuators, isolators, Bragg gratings and beam splitters, which are commercially available as one piece of optical fibre.

BRIEF DESCRIPTION OF THE FIGURES

Embodiments of the invention will now be described, by way of example, with reference to the drawings of which.

DETAILED DESCRIPTION OF THE FIGURES

Figure 1:
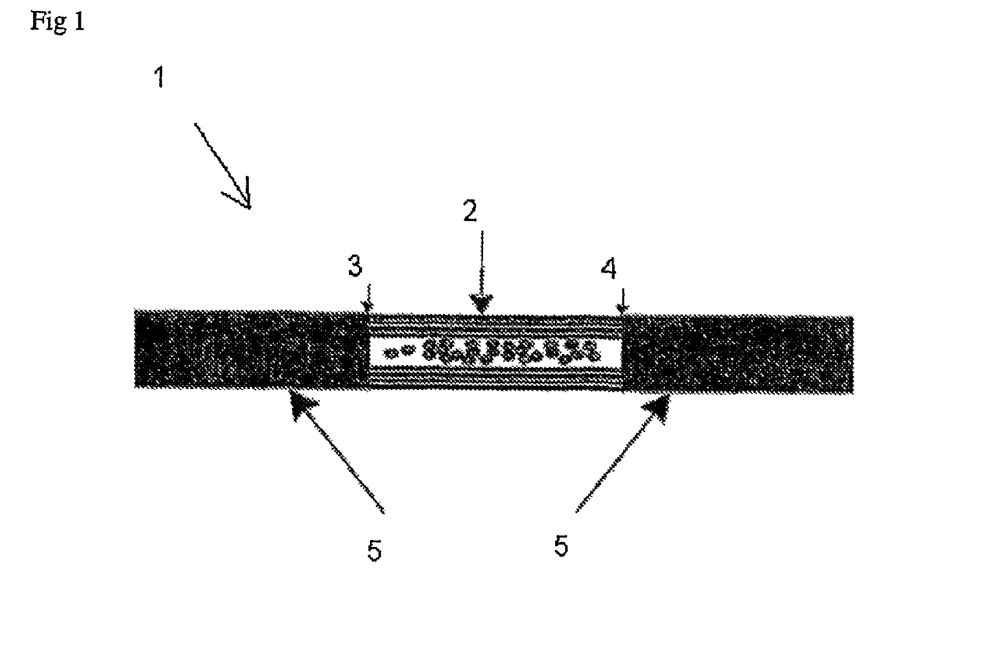
FIG. 1 is a schematic side view of the optical assembly.

Referring to FIG. 1 the device may be seen in more detail. An optical assembly (1) includes a gas cell (2) contiguously attached at a first (3) and second (4) end to respective optical fibre portions (5) so as to provide an integrated and optically continuous optical fibre.

The arrangement thus provides a hermetically sealed, stable, portable, compact and efficient optical fibre gas-cell, with low insertion optical loss.

The gas cell (2) contains one or more of a group of gases or atomic vapors, including Hydrogen and Acetylene dependent on the intended application. Gas-phase materials have many laser-related applications, allowing the invention to be used in processes such as Raman scattering and laser frequency stabilisation, as described in more detail below. The integration of the gas cell (2) within the optical fibre portions (5) makes it compact and self contained, allowing it to be put to practical use without the need for any other equipment.

Figure 2:
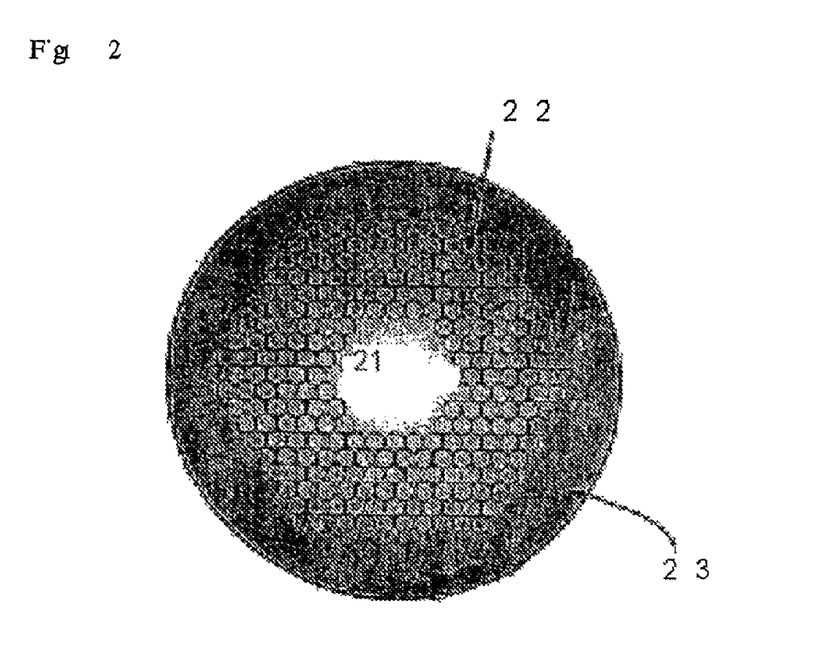
FIG. 2 is a cross sectional view of a Hollow-Core Photonic Crystal Fibre.

The gas cell (2) may be fabricated from any suitable material, such as Hollow-Core Photonic Crystal fibre (HC-PCF) also known as a band-gap fibre, air-guiding band-gap fibre, or microstructure fibre, as shown in FIG. 2 and which will be familiar to the skilled reader. In HC-PCF the hollow core (21) is surrounded by a cladding (22) of silica microcapillaries which creates a photonic band gap (PBG), trapping the light in the core and hence acting as a special optical fibre (waveguide) with the unique ability of guiding light in empty core. Physically, it is a fibre whose outer-diameter is around 125-200 µm and whose core diameter ranges from 5 µm to 20 µm, although in principle there is no upper limit for the diameter. The thickness of the silica web of capillaries is only a few 100 nanometers (typically: 300 nm-500 nm).

The optical fibre portions (5) can be formed from optical fibre of any appropriate known type, such as silica single mode fibre (SMF). The optical fibre and gas cell are preferably closely refractive index-matched and with similar mode-field diameter. The acetylene cells for example are made from HC-PCF with a guidance band centred at 1550 nm and a loss of 18 dB/km. In an embodiment the hydrogen cells are made from HC-PCF with a guidance band centred at 1064 nm and a transmission loss of 60-70 dB/km. In all cases the splice losses are 1-2 dB. The gas cell (2) is attached to the optical fibre portions (5) using a splicing technique. Any appropriate commercially known splicing device may be used for this process, such as a thermal filament fusion device such as the Vytran FFS-2000-PM developed by the Vytran Company or an electric discharge splicer. The splicing device is capable of sealing the gas cell (2) to the optical fibre portion (5) without causing either any damage and capable of sealing up to pressures of 80 bar, allowing high pressure gas cell containment.

Figure 3:
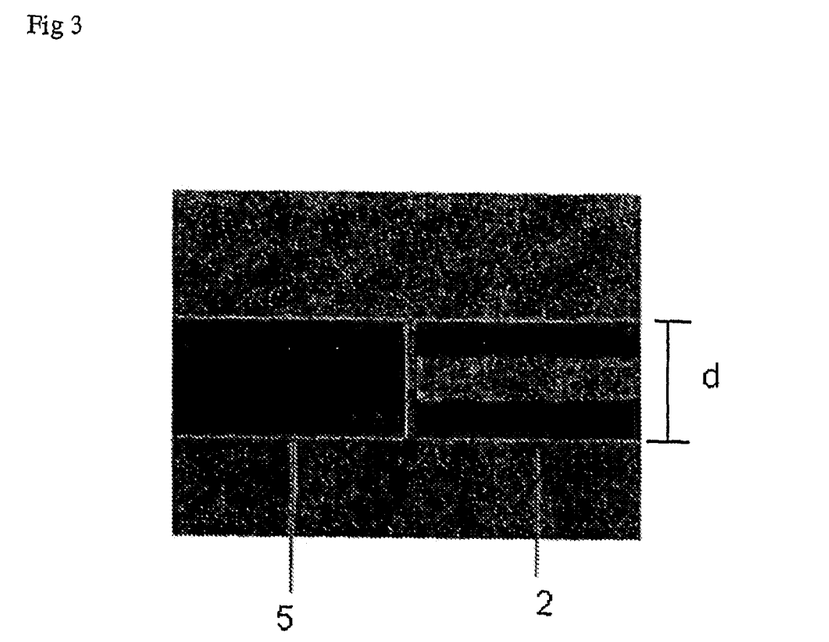
FIG. 3 is a schematic side view of a gas cell and optical fibre portion being aligned for splicing.

It is desirable to create an optical assembly (1) wherein the gas cell (2) is filled with one or more gases such as Hydrogen or Acetylene, and integrated within the optical fibre. The first step in such a process is to fusion splice a first end (3) of the gas cell (2) to an optical fibre portion (5). The splicing region is continuously purged by argon gas to stop the filament burning. This prevents contamination of the splice by solid deposits and water condensation, and also prevents combustion of flammable gases such as hydrogen and acetylene. For high fill pressures the splice could be consolidated using heat-curable glue. As shown in FIG. 3 it is preferable that the gas cell (2) and the optical fibre portion (5) are of similar external diameter (d) and are correctly aligned before the splicing procedure occurs.

For applications in which it is important that the gas contained within the gas cell (2) is pure, the gas cell (2) is now evacuated. This is achieved using the apparatus shown in FIG. 4. A second end (4) of the gas cell (2) is connected to a gas chamber (41) which is then connected to a vacuum pump (42) through a gas-inlet (43). The gas-inlet (43) and vacuum pump (42) used may be of any appropriate known kind. The evacuation procedure takes place at a pressure of approximately $10^{-2}$ mTorr over several hours.

Figure 4:
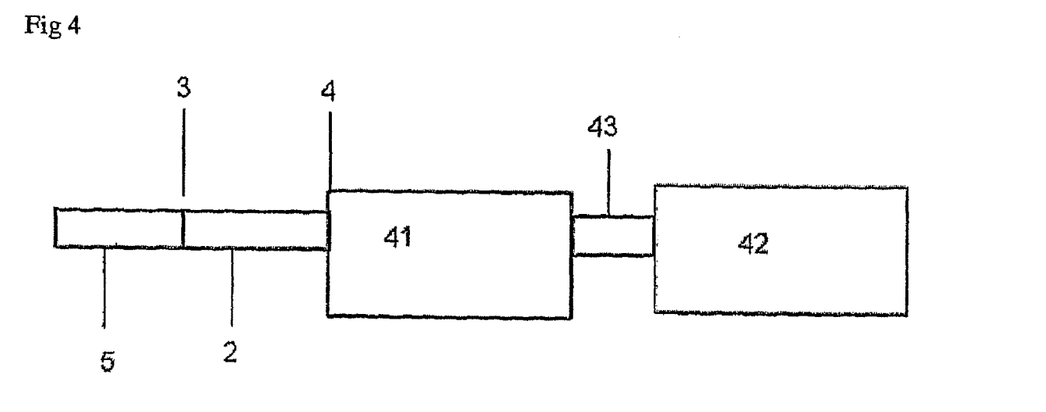
FIG. 4 is a schematic side view of a set-up for evacuation of the gas cell according to an embodiment of the invention.

Once the gas cell (2) has been evacuated to the desired vacuum level it is filled with gas via the gas chamber (41) using any appropriate known method. The gas cell (2) remains attached to the gas chamber (41) until the desired gas pressure within the gas cell (2) has been achieved, for example with gas fill pressures (before splicing) ranging from $10^{-2}$ mbar to 500 mbar for the acetylene and from 5 bar to 10 bar for the hydrogen cells respectively. The pressure is determined in any appropriate manner, for example by deduction using a model of viscous flow of an ideal gas along a tube of the same diameter as the HC-PCF core. After the filling process is complete, e.g. after the expected filling time derived from the model, the second end (4) of the gas cell (2) is disconnected from the gas chamber (41) and attached to an optical fibre portion (5), using a splicing device as described above.

Figure 10:
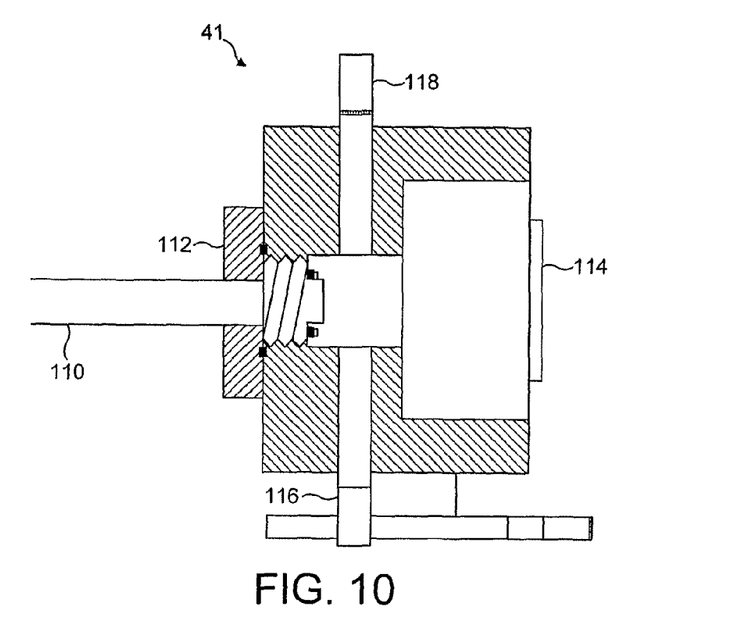
FIG. 10 is a schematic side view of a gas chamber used to fill and/or evacuate the gas cell.
Figure 11:
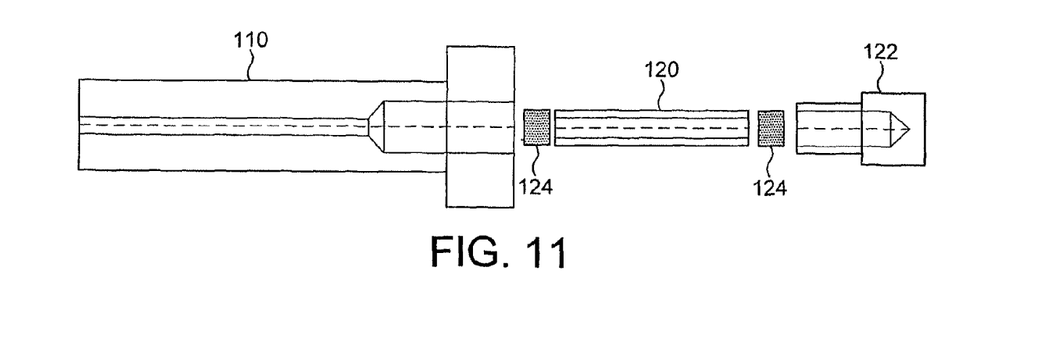
FIG. 11 is an exploded side view of a T-shaped holder included in the gas chamber of FIG. 10.

FIG. 10 shows a gas chamber (41) which is specifically tailored to hold fibres such as HC-PCF for filling and evacuation. The gas chamber (41) includes a T-shaped fibre holder (110), secured to the main body of the gas chamber (41) by a slotted clamp nut (112). FIG. 11 shows the T-shaped fibre holder (110) in more detail. It includes a cap (122) and a rod (120) which holds the fibre in place, attached to one another by way of mini O ring joints (124). The gas chamber (41) further includes a window (114), an inlet for pressure gauging (116) and an inlet for gas and/or vacuum loading (118). The gas chamber (41) is designed so as to allow fibres to be attached to or detached from it, whilst keeping the chamber hermetically sealed from the surrounding environment.

Figure 5:
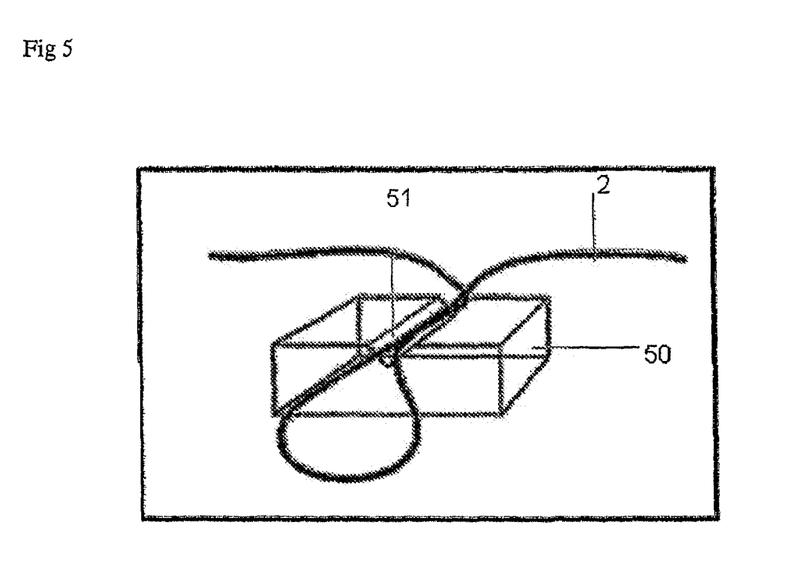
FIG. 5 is a perspective view of a gas cell placed in a clamping device.

The time taken between disconnecting the filled gas cell (2) from the gas chamber (41) and the completion of the splicing process is approximately 2 to 5 minutes. During this time it is possible for gas exchange to occur between the gas cell (2) and the surrounding atmosphere. This process may be slowed down by forming a restriction in the gas cell (2). One possible method of creating this restriction is shown in FIG. 5, whereby the gas cell (2) is placed in a channel (51) of a clamping device (50). The channel (51) squeezes the walls of the gas cell (2) together, reducing its cross-sectional area and restricting gas flow in and out of it.

Figure 6:
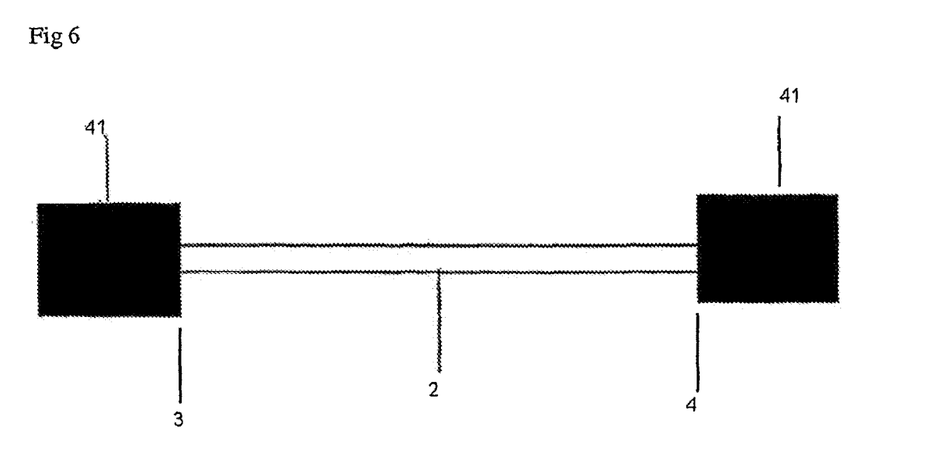
FIG. 6 is a side view of a set up for filling the gas cell according to an embodiment of the invention.
Figure 7:
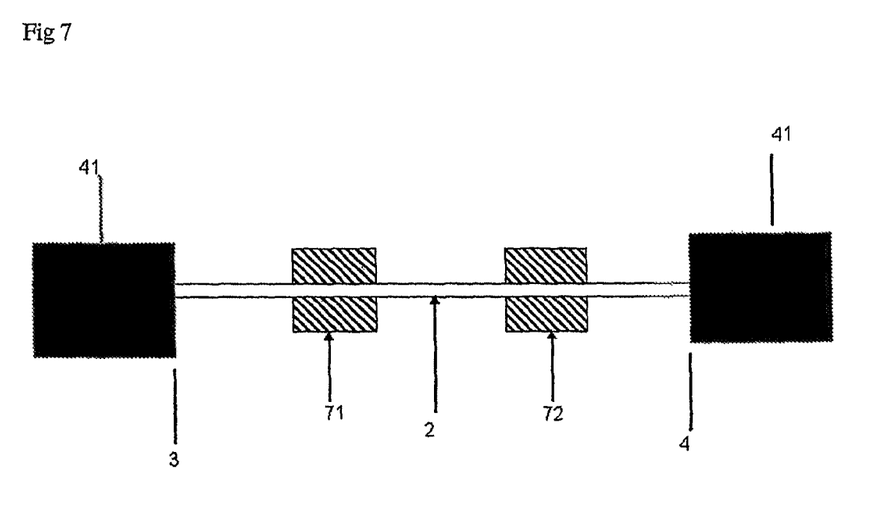
FIG. 7 is a side view of a set up for clamping the gas cell of FIG. 6.

Referring to FIGS. 6 and 7, an alternative sequence of splicing and filling may be used to create the optical assembly (1) described above. Initially, both the first (3) and second (4) ends of the gas cell (2) are connected to gas chambers (41). The gas cell (2) is then filled by a known method over an appropriate length of time. Once the filling process is complete, thermal "clamps" (71) and (72) are applied to the gas cell (2), positioned close to first end (3) and second end (4) respectively. Clamp (71) is now heated and clamp (72) is cooled by any appropriate method. This creates within the gas cell a locally high pressure region towards clamp (72). The gas chamber (41) at the second end (4) of the gas cell (2) is now removed to allow the second end (4) to be spliced to an optical fibre portion (5), in the manner described above. The process can then be reversed for first end (3) and the clamps then removed. For each end, during the period between disconnection from the gas chamber (41) and the completion of the splicing procedure, the internal pressure within the gas cell (2) should minimise gas leakage from the gas cell (2). It will be appreciated that the thermal clamps can equally be used to control gas flow in the embodiment described above with reference to FIG. 4.

The light power loss from the invention can be as low as 3 dB/km or lower depending on the Hollow-core PCF used in device. It is therefore possible to use it as a waveguide over long lengths. In theory there is no limit to the lengths or areas which could be developed. In addition, because of its optical stability, long lengths of the optical assembly (1) may be coiled into a chip, making it even more compact and portable. Furthermore, because of the greater length and narrow diameter available with a waveguide, improved operational efficiency is achieved.

The invention is capable of being integrated into several laser-related devices, for example, it may be used in a Stimulated Raman Scattering (SRS) device. SRS is described in this context in Benabid et al which is incorporated herein by reference. SRS is a two-photon inelastic light scattering process, whereby an incoming photon (pump) interacts with a coherently excited state of the Raman medium, and as a result, either a frequency downconverted (Stokes) or upconverted (anti-Stokes) photon is emitted. SRS is an ideal method for providing efficient laser frequency conversion and high-resolution spectroscopy. Up until recently, however, to achieve reasonable frequency conversion efficiency, high power lasers ($\geq$MW) were required, severely limiting the potential applications of SRS in nonlinear optics and technology. Conventionally, the threshold power for gas-SRS (the pump power required to achieve ~1-2% conversion to the Stokes) has been reduced by using multi-pass cells or resonant high finesse Fabry-Perot cavities. Limitations of these approaches include that the reduction of the threshold is limited, the apparatus is voluminous and the conversion to the Stokes remain poor.

As a potential solution to these problems, Benabid et al propose a different approach to generating SRS, using hollow-core photonic crystal fiber filled with Raman active gas. This has lifted the longstanding reliance of SRS on powerful lasers, thus making the approach an ideal way for efficient SRS generation. In "Ultra-high efficiency laser wavelength conversion in gas-filled hollow core photonic crystal fibre by pure stimulated rotational Raman scattering in molecular hydrogen", PRL, volume 93, issue 12, page 123903, the same authors also demonstrated that using a 35 m long fibre with inner diameter of ~7 μm could reduce the power required for Stimulated Raman Scattering (SRS) generation by a factor of 1 million. In both these cases, however, it was necessary to use cumbersome gas delivery chambers at the end of the fibre.

Figure 8:
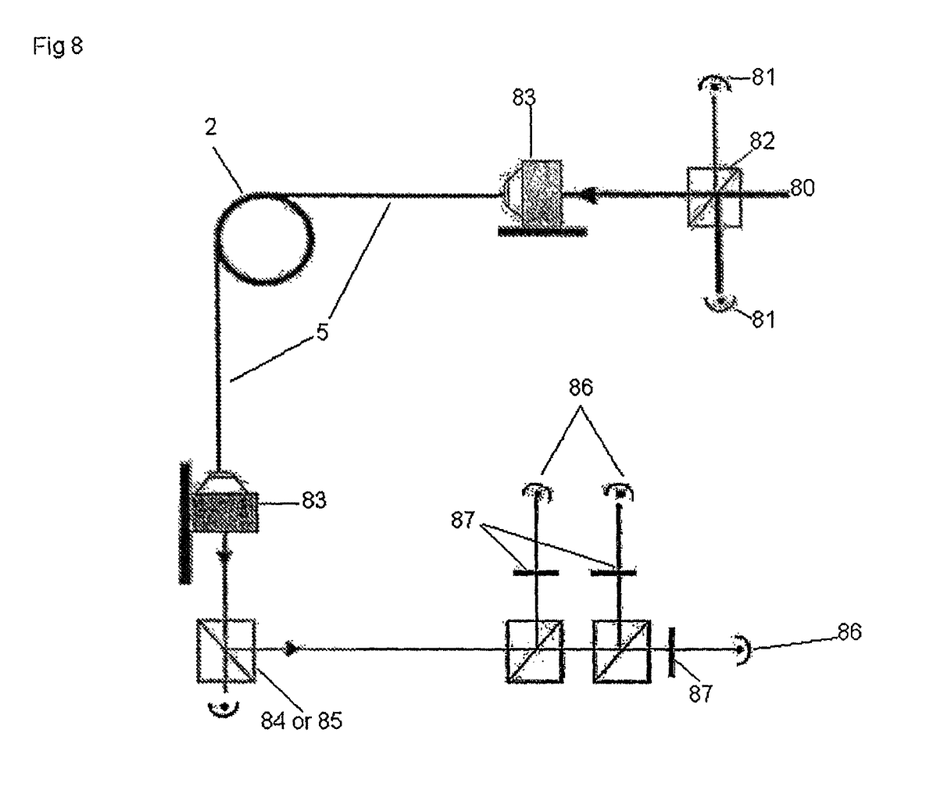
FIG. 8 is a block diagram showing the optical assembly incorporated in a SRS device.

An improved SRS device over Benabid et al which includes the invention is shown in FIG. 8. The gas cell (2) has a core diameter of 15 μm, is spliced at either end to an optical fibre (5) and is filled with hydrogen gas in the manner described above. The gas cell (2) is pumped with a Q-switched single-mode frequency-doubled Nd:YVO$_4$ laser (not shown) operating at a wavelength of 1047 nm, with a pulse-width tunable in the range 6 ns to 50 ns and generating a beam (80). For improved compactness, integrability and portability, the laser source chosen could be either a pigtailed laser or fibre laser After passing through a neutral density filter and a telescope (not shown) to optimize the coupling efficiency, the laser beam (80) is divided in two at a 50/50 beamsplitter (82). One beam is sent to a power meter (81) for stabilisation/calibration purposes, and the second beam is coupled to the lowest-order air-guided mode of the gas cell (2) using an objective lens (83). If the laser used is either a pigtailed or fibre laser, the objective lenses (83) may be omitted from the set-up. The light emerging from the gas cell (2) passes through a second objective lens (83) before being split into two beams. One is sent either to an optical spectrum analyzer (84) or to a fast photodetector (85) which monitor the total transmitted power. The other is sent to a set of calibrated fast photodetectors (86) in front of which are placed appropriate 10-nm bandpass colour filters (87) which separate out the pump, Stokes, and anti-Stokes signals. This setup allows rapid characterization of the generated Stokes and anti-Stokes signals as functions of pump power, interaction length, and gas pressure. In addition, the richness of the spectrum produced by this apparatus at low peak powers illustrates the extreme effectiveness of the invention in SRS devices, in a significantly less bulky configuration than that described in Benabid et al.

The invention has also been tested as part of a laser frequency measurement or stabilisation system. Accurate and stable laser frequencies are required for various applications, such as high-resolution spectroscopy, measurements of fundamental physical constants, atomic physics and quantum optics. Optical telecommunication is another field, which has an increasing need for wavelength accuracy and stability in order to enhance the number of channels in wavelength division multiplexing and demultiplexing (WDM) systems. Despite the progress made in reducing the linewidth of free running semiconductor laser systems such as extended cavity diode lasers (ECDL), problems such as long-term frequency instability and drift still remain. In order to ensure both accuracy and long-term frequency stability of free running lasers, the laser frequency is usually locked to an optical frequency reference. This consists of interacting a single-frequency laser with an ensemble of atoms or molecules that exhibits an absorption line suitable as a reference for frequency stabilisation. When the laser frequency is tuned across the resonance, a part of the power is transferred from the laser radiation to the absorber and an absorption feature is detected as a function of the laser frequency. The stabilisation circuit converts this absorption signal to an error signal, which is then used to hold the laser frequency at a given position of the absorption line. The performance of a reference line is determined by the stability and reproducibility of its reference frequency, which in turn is determined by (a) a high quality factor; $Q=v/\Delta v$, where v is the carrier frequency and $\Delta v$ is the linewidth of the reference line (b) a weak dependence on external disturbances (e.g. temperature, strain and pressure). Furthermore, for absolute and reliable laser frequency stabilisation, a second and independent frequency standard is required. Up until now, such a system has been very complex and necessitates large amount of space.

Figure 9:
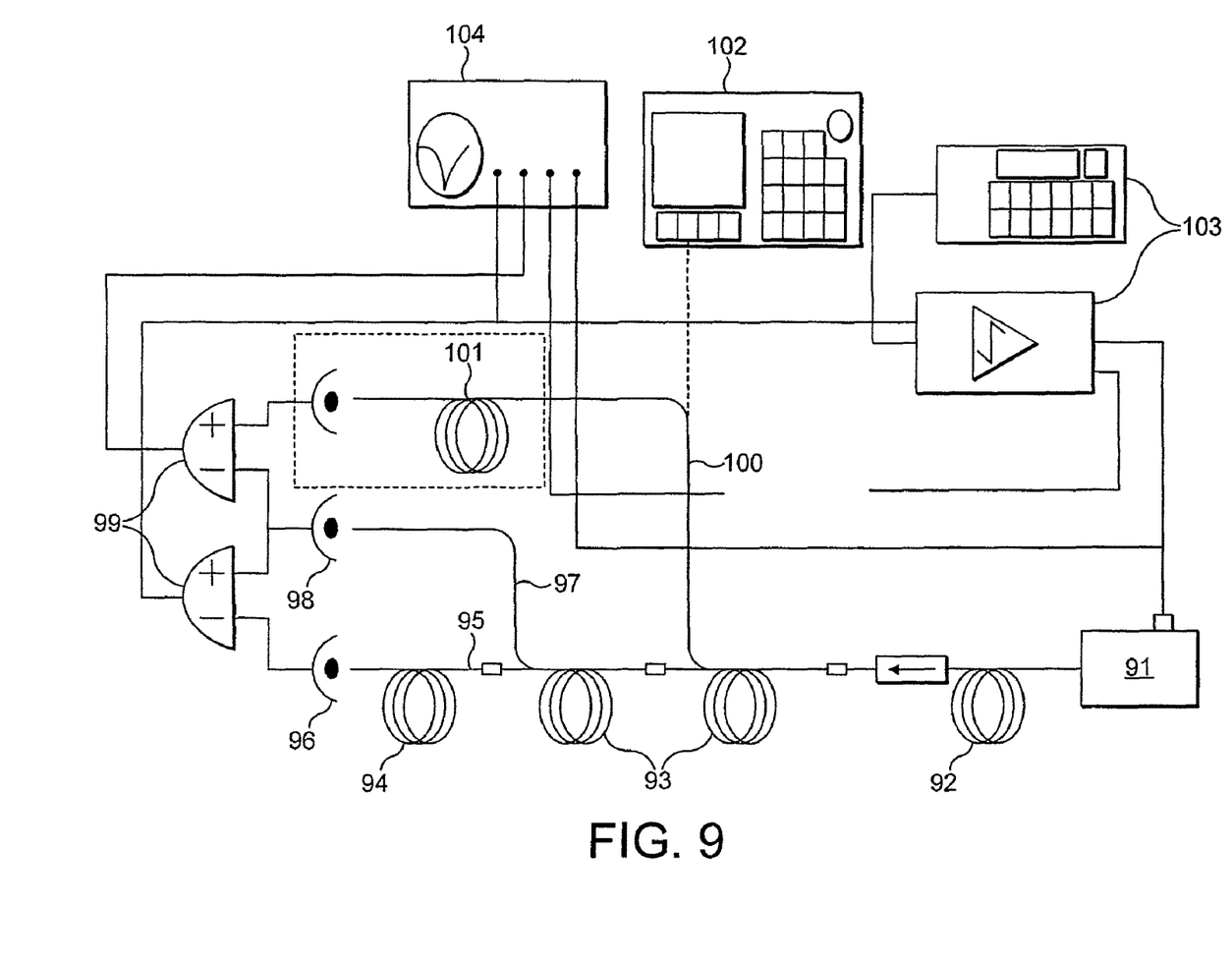
FIG. 9 is a block diagram showing the optical assembly incorporated in a laser frequency locking system

FIG. 9 shows the invention incorporated into a system for laser frequency locking. A laser beam from a commercial tunable ECDL (91) is coupled to an all-fibre system consisting of an isolator (92), two couplers (93) and an acetylene filled Hollow-Core Photonic Crystal Fibre (HC-PCF) (94) gas-cell of the type described above. After passing through the isolator (92), the laser output, is split by the two couplers (93) into three beams. A first locking beam (95) passes through the acetylene filled HC-PCF (94) and is then detected with a photodetector (96). A second reference beam (97) is detected with an identical detector (98). The signals of the locking (95) and the reference (97) beams pass through a difference amplifier (99), to reduce the effect of laser intensity fluctuations, before being fed to a locking circuit unit (103). Before locking, the wavelength of the laser is first tuned to the desired absorption line by adjusting the laser diffractive grating and the piezo-electric transducer (PZT) or any other appropriate corrector while observing the wavelength value on an optical spectrum analyzer (102) and monitoring operation using for example an oscilloscope (104) or RF spectrum analyser. The absolute stability of the laser frequency is then tested independently via a third, out-of loop beam (100), which is sent to an independent frequency discriminator (101) consisting of a second HC-PCF based acetylene cell. Thus the control and the monitoring of the laser stabilisation are carried out using a completely fibre based system.

It has been demonstrated that the system in FIG. 9 can be successfully used to lock the laser frequency to different acetylene absorption lines. Acetylene is a useful choice of filling gas, as it offers an excellent frequency standards source for the optical communication wavelength; however it will be appreciated that the system could easily use a different frequency gas or atomic vapour such as Iodine, Rubidium or Carbon Dioxide, etc. It has also been demonstrated that use of HC-PCF in such a system has led to unprecedented improvement in signal-to-noise ratio, making overtone absorptions in the visible and near-infrared accessible to laser frequency metrology, however it is further appreciated that any gas cell acting as a waveguide may be employed in such a system.

In a further approach, for low pressures, a buffer gas can be used. In that case, the filling process proceeds initially as described above with reference to FIG. 4 in which a first end of the gas cell is fusion spliced to an optical fibre portion and filled with the sample gas. In the next step the environment is evacuated to bring the active or sample gas to a desired pressure. A buffer gas is then injected for example at 2-3 bar. The environment can then be brought to ambient pressure and the free end of the gas cell can be spliced in open air. Thereafter the gas cell can be placed in vacuum once again to allow removal of the buffer gas.

In particular use of the buffer gas at high pressure allows the final splicing stage to be carried out under ambient pressure because the buffer gas remains in the gas cell as a result of its capillary nature typically for some three to five minutes. The buffer gas is, however, selected to be permeable through the gas cell walls and hence the final stage of placing the fully spliced cell into vacuum accelerates the permeation of the buffer gas and hence speeds up the process by which only the active or sample gas remains in the cell.

In one preferred approach the buffer gas comprises for example helium, xenon or argon although it would be appreciated that any appropriate gas which is not reactive with the active gas and which has high permeation through silica can be selected. For example this selection may be dependent on the specific HCF material. The active gas may comprise for example acetylene.

One possible implementation of this system lies in laser frequency stabilisation of the nature described above and in more detail below. In that case the active gas is preferably an atomic vapour at a very low pressure providing an extremely narrow spectral line. The active gas may be, for example obtained by metal vaporisation of rubidium. In that case the provision of a buffer gas in addition to allowing low pressure operation also protects against the highly reactive atomic vapour and permeates out to leave only the low pressure atomic vapour.

Figure 12:
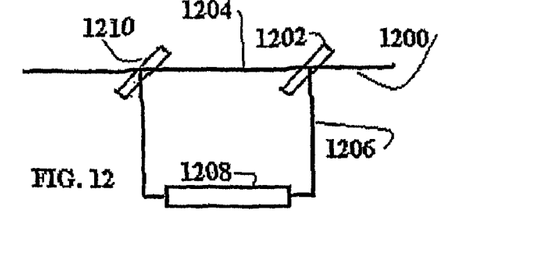
FIG. 12 is a schematic view of an optical delay circuit.

A further possible implementation of this arrangement can be further understood with reference to FIG. 12 in which an arrangement is shown allowing a delay to be introduced between optical branches using so called "slow light". According to the system, input light 1200 is split for example by a half silvered mirror 1202 into a non delayed component 1204 and a delayed component 1206. The delayed component is conveyed for example by a fibre optic channel to a gas cell of the type described above including an active gas at very low pressure, reference 1208. As is well known, using appropriate tuning the gas cell can effectively introduce a propagation delay into the light passing through it. The light is recombined for example at the further half silvered mirror 1210 and the effects of the delay between the delayed and un-delayed portion can then be monitored as appropriate. In another possible implementation of such a low pressure configuration, electromagnetically induced transparency (EIT) can be achieved. EIT comprises an important development in quantum optics, but requiring very low pressure/high vacuum range values for the confined gas.

EIT comprises an effect in which an medium driven by a control laser, a probe laser whose frequency is close to an otherwise absorbing transition will experience a narrow window of transparency at the centre of the absorption profile. The effect is based on coherent population trapping in which a combination of two laser fields excites a three level system into a coherent super position state of the two lower energy states. In such a case the quantum system can simultaneously occupy both states in a phase-lock fashion and the two possible light pathways can interfere and cancel each other. The net result of this destructive quantum interference is that none of the atoms or molecules are promoted to the excited state, leading to vanishingly small optical absorption. In addition the transparency is accompanied with a very sharp change in dispersion. This effect is useable for example in ultra slow light, light storage, laser cooling, non-linear optics and atomic clocks.

Figure 13:
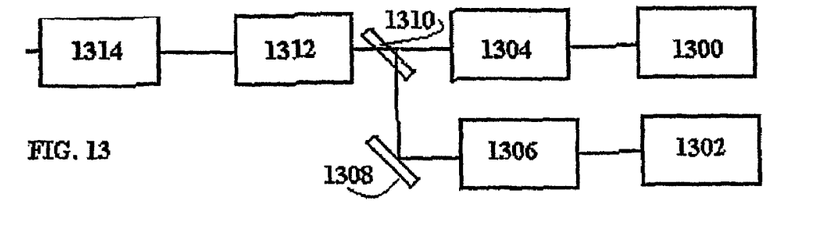
FIG. 13 is a schematic view of an electromagnetically induced transparency circuit.

An apparatus for providing EIT is shown in FIG. 13 and comprises a control laser 1300 and a probe laser 1302 which pass respective beams through first and second polarisers 1304, 1036. The beams are recombined via mirrors 1308, 1310 before passing through an acetylene-filled HC-PCF cell 1312. The beam then passes into a further polariser 1314 and out to any appropriate output.

The control beam is provided at approximately 500 mW by any appropriate commercial tunable external cavity diode laser amplified for example by a 1 W erbium-doped fibre amplifier and is resonant with an absorption line P(J+1) in the P branch of the overtone band of acetylene. The probe laser 1302 delivers a probe beam of approximately 200 µW delivered by a second tunable external cavity diode laser tuned around an absorption line either R(J+1) or R(J−1) in the R-branch. The respective beams are cross polarised by polariser 1304, 1306 and at the output of the HC-PCF 1312, the control beam is filtered out by polariser 1312 or another appropriate interference filter leaving the probe beam to be transmitted and detected. The transmission profile of the probe absorption line is generated by sweeping the frequency of the probe laser for example by driving a piezo-electric transducer, giving a span bandwidth of approximately 1 GHz. In the cell 1312, the fibre has a guidance band centred at 1550 nm and has a 20 µm core diameter. The choice of a larger core is motivated by the need to reduce the collision rate of the gas with the core wall reducing any sources of dicoherence. According to this approach EIT can be observed.

Figure 14:
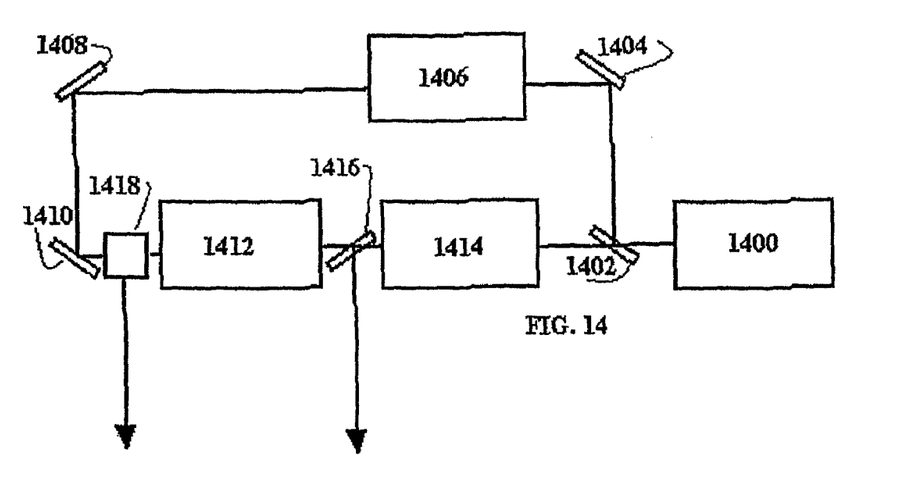
FIG. 14 is a schematic view of a saturable absorption circuit.

Referring to FIG. 14 it will be seen that saturable absorption can also be observed using a cell of the type described herein comprising an acetylene-filled HC-PCF. In this configuration both control and probe beams are delivered by an amplified external cavity diode laser of the type described above, reference numeral 1400. The laser 1400 is tuned around an absorption line of the acetylene overtone band. The beam is approximately 1 watt and split by a 50/50 splitter for example a half silvered mirror 1402 to provide two counter propagating beams through the gas cell. One beam is deflected to mirror 1404 and through a polariser 1406 and then enters the cell 1412 in the first direction. The undeviated beam passes through splitter 1402 and polariser 1414 into the other end of the gas cell. A further polariser and circulator 1416 is provided at the output end of the cell 1412 for the selected beam and a second circulator 1418 is provided at the output end of the gas cell 1412 for the undeviated beam. A probe signal output is received from the first component 1416 and a monitoring output from the second component 1418. As a result the polarisation of the counter propagating beams is controlled by the polarisers and provision of a circulator at both ends of the gas cell (1418, 1416) ensures that beams counter propagating through the cell 1412 cannot be detected at the output of the circulators and are not coupled back into the laser system. One of the gas cells splices typically has a higher loss than the other which ensures that one of the counter propagating beams is weaker than the other. The beam coupled by the high loss splice into the cell is used as the weak, probe field and can be detected as appropriate.

It will be appreciated that the applications for which the invention may be used are not limited to those described above. It is proposed that such efficient gas filled fibres will enable compact devices such as atomic timers to be developed. The technology could also be used to enable the development of a variable continuous wave/modelocked pulsed femtosecond lasers, without restriction on the location of the central wavelength, as well as miniaturised laser colour-conversion devices.

The gas cell material is not limited to Hollow-Core Photonic Crystal Fibre; any suitable gas cell acting as a wave guide may be employed. The optical fibre portion material is not restricted to single mode fibre, and may be replaced by a free space arrangement where appropriate. The arrangement may be integrated into a microchip. The gas cell may be filled with any suitable gas or gases by any appropriate means. The splicing procedure may be carried out using any appropriate known splicing device.

The invention claimed is:

1. An optical assembly comprising:
   a gas cell comprising a waveguide formed of hollow core photonic crystal fibre (HCPCF); and
   at least one optical fibre portion in which the gas cell is contiguously attached to the at least one optical fibre portion.

2. The optical assembly of claim 1, wherein opposing ends of the gas cell are attached to respective ones of the optical fibre portions.

3. The optical assembly of claim 1, wherein the gas cell is spliced to the at least one optical fibre portion.

4. The optical assembly of claim 1, wherein the gas cell contains a gas.

5. The optical assembly of claim 4, wherein the gas may be one or more gases of the group consisting of Hydrogen and Acetylene, Iodine, Rubidium and Carbon Dioxide.

6. A method of fabricating an optical assembly, the assembly including a gas cell comprising a waveguide formed of a hollow core photonic crystal fibre (HCPCF) and having a first end and an opposing second end, the first and second ends contiguously attached to a corresponding optical fibre portion, the method comprising the following steps in any order:
    splicing the first end of the gas cell to an end of one of the optical fibre portions;
    splicing the second end of the gas cell to an end of another one of the optical fibre portions; and
    filling the gas cell with a gas.

7. The method of claim 6, wherein the first end is spliced, then the gas cell is filled using a gas chamber, and then the second end is spliced.

8. The method of claim 6 wherein the gas cell is filled with gas and then spliced at the first and second ends to the corresponding optical fibre portions.

9. The method of claim 8 wherein the gas cell is clamped adjacent the first and second ends prior to filling.

10. The method of claim 9 wherein the gas cell is clamped using thermal clamps.

11. The method of claim 6, wherein the gas cell is filled with one or more gases of the group consisting of Hydrogen, Acetylene, Iodine, Rubidium and Carbon Dioxide.

12. The method of claim 7, comprising the step, after the gas cell has been filled with the gas and before the second end is spliced, of forming a flow restriction in the gas cell.

13. A stimulated Raman scattering apparatus including an optical assembly as claimed in claim 1.

14. A method of carrying out stimulated Raman scattering using an optical assembly as claimed in claim 1.

* * * * *